United States Patent [19]

Takahashi

[11] 4,176,946

[45] Dec. 4, 1979

[54] COLOR PRINTER AND METHOD OF CONTROLLING EXPOSURE TIME THEREFOR

[75] Inventor: Koji Takahashi, Minami-ashigara, Japan

[73] Assignee: Fuji Photo Film Co., Ltd., Minami-ashigara, Japan

[21] Appl. No.: 817,059

[22] Filed: Jul. 19, 1977

[30] Foreign Application Priority Data

Jul. 20, 1976 [JP] Japan .................................. 51-86275

[51] Int. Cl.² .......................................... G03B 27/78
[52] U.S. Cl. .................................... 355/38; 250/226; 355/77; 356/404
[58] Field of Search ............................ 355/38, 77, 68; 250/226; 356/175-177

[56] References Cited

U.S. PATENT DOCUMENTS

| | | | |
|---|---|---|---|
| 3,161,108 | 12/1964 | Modney | 355/38 |
| 3,292,488 | 12/1966 | Griffith | 355/77 X |
| 3,677,641 | 7/1972 | King et al. | 355/68 |
| 3,708,676 | 1/1973 | Huboi et al. | 355/38 X |
| 3,724,947 | 4/1973 | Paulus | 355/38 |
| 3,790,275 | 2/1974 | Huboi et al. | 355/68 |
| 3,819,275 | 6/1974 | Aimi et al. | 355/38 X |

*Primary Examiner*—Richard A. Wintercorn
*Attorney, Agent, or Firm*—Gerald J. Ferguson, Jr.; Joseph J. Baker

[57] ABSTRACT

A color printer having three color filters is provided with a filter controller which controls the insertion time of the color filters to print a particular color such as a flesh color of a human figure into a preferable particular color of preferable color balance and density. The filter controller includes an arithmetic memory circuit which memorizes for three primary colors a relation between the color density of the particular color in the color original and the preferable insertion time of the color filters to print the particular color into the preferable particular color on the color paper.

7 Claims, 8 Drawing Figures

SPECTROSCOPIC ENERGY
DISTRIBUTION OF LIGHT
GIVEN TO COLOR PAPER

TURN-OFF TIME OF LIGHT SOURCES

COLOR PRINTER AND METHOD OF CONTROLLING EXPOSURE TIME THEREFOR

BACKGROUND OF THE INVENTION

1. Field of the Invention

This invention relates to an automatic color printing system, and more particularly to a color printer and a method of automatically determining exposure in a color printer. More specifically, the present invention pertains to a color printing method in which a predetermined color is first detected in a color original (negative or positive color film) and when the color has been detected, the exposure is determined to print the color in a predetermined desired color balance and density.

2. Description of the Prior Art

Throughout the specification, the term "color printer" should be interpreted not only as a color printer in which a measuring portion to measure the density and color balance of a color original to obtain necessary information and a printing portion to print a color image on a color paper are connected on-line with each other, but also as a color printing system comprising a measuring portion which has a recording means such as a punched tape or a magnetic tape and a printing portion separated from the measuring portion to print color images according to the recorded information.

In determining exposure in color printers, various methods have been known and practically employed. A well-known printing system in which the printing light source intensity is adjusted during red, green and blue exposures to levels which will normalize the resulting integrated transmittances to a near-neutral color balance, i.e., "gray," is based on U.S. Pat. No. 2,571,697, Evans. This printing system produces satisfactory results from a large majority of the negatives of a given type of film. It has also been known in the art to adjust the rate of correction for red, green and blue exposures based on a linear combination of the red, green and blue large area transmission densities (LATD) of the original to be printed.

When the LATD system is used, the exposure time Ti for each color is represented by the following equation $$\log T_i = \alpha_i D_i + \beta_i$$

where $\alpha$ and $\beta$ are numerical constants and $D_i$ is the LATD of each color (i indicated red, green or blue).

Since the above described conventional printing systems are based on the integrated transmission measurements conducted over the whole area of the original, the obtained prints are not always satisfactory. For instance, if the background of the principal subject matter is primarily red (red curtain or furniture), green (green grass or foliage) or blue (blue sky or water), color correction based only on the aforesaid LATD system is unsatisfactory. This problem is known as "color failure."

Further, if the background of the principal subject matter is of particularly high or low brightness, the conventional correction based on the integrated transmission density does not give satisfactory results. For example, when the principal subject matter has been photographed with a back light or in a spotlight conventional correction will give unsatisfactory results. This is known as "density failure."

According to the inventors' tests, in the color printing process using the LATD printing system the yield of satisfactory prints is about 70% of all the prints obtained.

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

According to the inventors' investigation, about 80% of the color originals have figures as the principal subject matter. Further, in looking at printed color photographs, it is well known that most people are concerned about the faces of the figures. Therefore, in printers, it is desirable that the faces of the figures be printed in a good condition. An exposure controlled to obtain a good flesh color in the areas of flesh color might be improper for areas other than the flesh color areas. However, even so, the yield of satisfactory prints is higher, if the exposure control is based on the flesh color areas.

Further, in most color originals is photographed trees, blue skies, blue sea, or in winter snows, together or without the human figure. Since these particular subjects are well known and the color thereof is well memorized, the photographers are also interested in the reproduction of the color of these particular subjects. These colors are, therefore, also desired to be reproduced in the desirable color which may not be automatically obtained by the conventional LATD method.

Thus, it is proposed to print color originals based on the color of a particular subject when the originals contain over a certain number of points of the color of the particular subject. If the originals have no areas of the particular color, the exposure may be controlled according to the conventional LATD printing system or the like.

SUMMARY OF THE INVENTION

It is therefore the primary object of the present invention to provide a method of automatically printing color photographs in which the exposure is automatically controlled to obtain a desirable reproduction of the color of a particular subject.

It is another object of the present invention to provide a method of automatically printing color photographs in which color failure and density failure are effectively prevented.

It is a specific object of the present invention to provide a method of automatically printing color photographs in which the flesh color of the principal subject matter is detected and the exposure is controlled to reproduce the flesh color in a desirable color balance and density.

The particular subject in the color originals such as the human figure, trees, blue skies, snows etc. is of a well known definite color. Therefore, the particular subject can be defined by a particular color, for instance, in case of the human figure by flesh color, trees by green, skies by blue and snows by white or bluish white. The method of the present invention is characterized in that the particular color is first detected and when the particular color has been detected the particular subject is printed in the predetermined desired particular color. When the particular color is to be reproduced, color filters of the color printer are controlled of their insertion time to obtain the desired particular color. In order to obtain the proper insertion time of the color filters, a great labor and time are needed to calculate the time. Therefore, a general formula representing the relation between the density of the three color components of the particular color on the color originals and the insertion time of the three color filters to obtain the desired density of the three color components of the particular color on the color paper is prepared in advance, and the insertion time is easily obtained by use of the general formula.

The color prints obtained in accordance with the present invention give a desirable flesh color when the principal subject matter is a human figure, give a desirable green color of trees when the trees occupy a large area in the original, give a desirable blue color of skies when the skies occupy a large area in the original, and give a desirable bluish white color of snows when the snows occupies a large area in the originals.

DETAILED DESCRIPTION OF THE INVENTION

Figure 1:
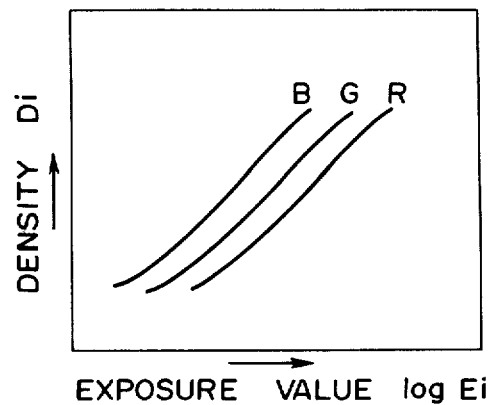
FIG. 1 is a graph showing the characteristic curves of a color photographic paper.
Figure 2:
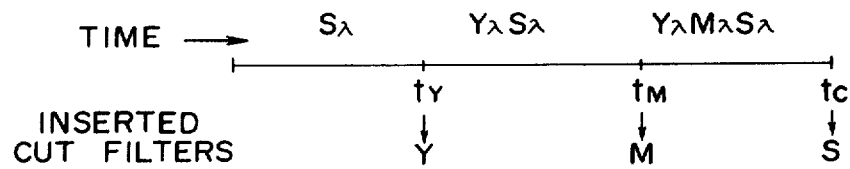
FIG. 2 is a time scale showing the timing of the insertion of cut filters used for controlling exposure.

In the present invention, the correctness in detection of the particular subject such as a human figure, trees, skies and snows etc. greatly influences the reproduced color on the color prints. Therefore, it is highly required that the particular subject can be precisely detected. In order to automatically detect the particular subject, it is desirable that the particular subject is defined by its color and the existence of the particular subject is detected by detecting the particular color thereof. Therefore, the particular subjects were picked up from a number of color originals and the red, green and blue densities of the color of the particular subjects were measured, and then the color of the particular subjects were defined by color regions in a chromatic coordination system in which the red, green and blue densities or combinations thereof were used as the axes. The regions of the particular colors should not be too large so that the color different from the particular colors may not be included in the regions, and should not be too small so that the particular color may not be excluded from the regions. Practically, the size of the region is preferred to include 95% of the data indicating the particular color.

According to the tests conducted by the present inventors, it has been proved possible to define flesh color by an ellipse in a two-dimensional coordination system, or an ellipsoid in a three-dimensional coordination system. The area which defines the flesh color for improving the yield in the color printing system should contain almost all colors which can be referred to as flesh color and should never include a color which cannot be referred to as flesh color. Further, such area should be clearly defined.

The present inventors measured a number points of flesh color in a number of color negatives by means of a flying spot scanner (FSS). The size of the scanning spot was 1 mm in diameter.

In the practical application of the present invention to a color printing system, the number of points which are detected as being particular color sould be counted to determine if there is a particular subject such as a human figure, snows, skies, sea or trees. If the counted number is too small, the original does not have particular subject. According to the inventors' tests, the principal subject matter can be determined to be a figure having flesh color for instance, when the number of flesh color points is not less than 13 among 748 sampled points, which corresponds to about 1.74 to 1.8%. When it is determined that the color original has a particular subject, the average densities $\overline{R}$, $\overline{G}$ and $\overline{B}$ of the color original are calculated and used for reproducing the particular subject in a desirable color. The average densities may be obtained by simply calculating the average densities from the data on all the points of the particular color, or by calculating the average densities from the data on only a selected part of the original, i.e. the data on the points of the particular color which are in a preselected part of the original, e.g. a central section of the original. Further, the average densities may be obtained by calculating the average densities from the data on all the points of the particular color which are selectively given weight relative to their positions in the original.

The exposure is controlled in the color printer to print the average densities $\overline{R}$, $\overline{G}$ and $\overline{B}$ into preferable densities R', G' and B'. By controlling the exposure in this manner, the particular color is reproduced into a preferable particular color of preferable color balance and density.

Now an embodiment of the present invention will be described in detail wherein the particular color photographed on a color original is a flesh color and the flesh color is reproduced into a preferable flesh color.

When the average color densities $\overline{R}$, $\overline{G}$ and $\overline{B}$ of the flesh colored subject on the color original are printed on a color paper into the depreferable color densities of R', G' and B', the flesh colored subject is printed into the preferable color balance and density.

In color printing, there are known a subtractive printing process and an additive printing process both of which can be employed in the present invention. The description hereinbelow will be made with respect to the subtractive color process. In the subtractive color process, three cut filters of cyan C, magenta M and yellow Y are inserted into the printing optical path to control the exposure. Therefore, the insertion time of the three cut filters C, M and Y is controlled to obtain a print of desirable quality.

Considering the spectroscopic sensitivity, $x_i D_\lambda$, at the density D of the color photographic paper, the spectroscopic energy distribution, $S_\lambda$, of the light source of the color printer, the spectroscopic transmission distribution, $T_\lambda$, of the color negative film, the exposure value required to obtain a desired density D on the print is given by:

$$\log E_i^D = -\log \frac{\int S_\lambda \cdot T_\lambda \cdot x_i D_\lambda d\lambda}{\int S_\lambda d\lambda} \quad (1)$$

wherein $i = R, G, B$ and $\lambda$ is the wavelength.

By changing the density D from zero to $D_{max}$, three characteristic curves can be obtained by calculation. The three characteristic curves thus obtained are shown in FIG. 1.

Therefore, when the spectroscopic energy distribution $S_\lambda$ of the light source of the color printer and the spectroscopic transmission distribution $T_\lambda$ (which is determined from three color densities, R, G and B, of the color negative) are known, and the exposure value is given, the resulting densities R', G' and B' can be estimated. Therefore, the preferred densities R', G' and B' can be obtained on the color photographic paper by controlling the spectroscopic energy distribution $S_\lambda$ of the light source.

Figure 4:
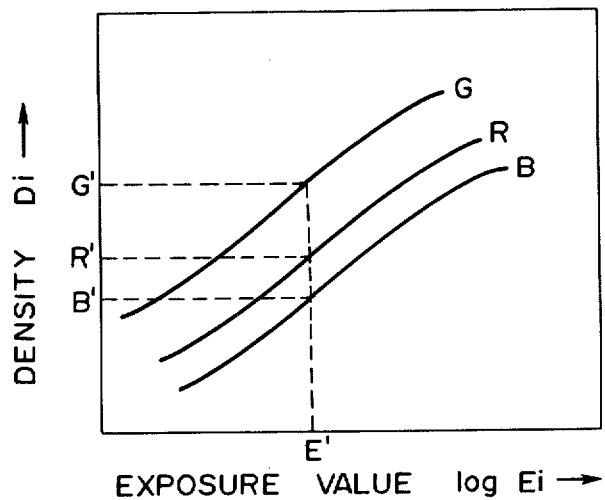
FIG. 4 is a graph showing the characteristic curves of the color photographic paper at a stage which is utilized in the present invention where the desirable densities of three colors can be obtained at once.

Considering the spectroscopic distribution of the cyan C, magneta M and yellow Y cut filters, $C_\lambda$, $M_\lambda$, $Y_\lambda$, and the insertion time of the cut filters, $t_C$, $t_M$, $t_Y$, and assuming that the cut filters are inserted into the optical path of the printer as shown in FIG. 4, the spectroscopic energy distribution of the light given to the color photographic paper, $S_\lambda'$, is given by $$S_\lambda' = t_Y S_\lambda + (t_M - t_Y) Y_\lambda S_\lambda + (t_C - t_M) Y_\lambda M_\lambda S_\lambda \quad (2)$$

$$S_\lambda' = t_Y S_\lambda \{1 + (\frac{t_M - t_Y}{t_Y})Y_\lambda + (\frac{t_C - t_M}{t_Y})Y_\lambda M_\lambda\} \quad (3)$$

Then, replacing $(t_M - t_Y/t_Y)$ by a, and $(t_C - t_M/t_Y)$ by b, $$S_\lambda' = t_Y S_\lambda (1 + aY_\lambda + bY_\lambda M_\lambda) \quad (4)$$

Therefore, the estimated characteristic curves in this case are given by $$\log E_i^D = -\log \frac{\int S_\lambda' \cdot T_\lambda \cdot x_i D_\lambda d\lambda}{\int S_\lambda' d\lambda} \quad (5)$$

Figure 3:
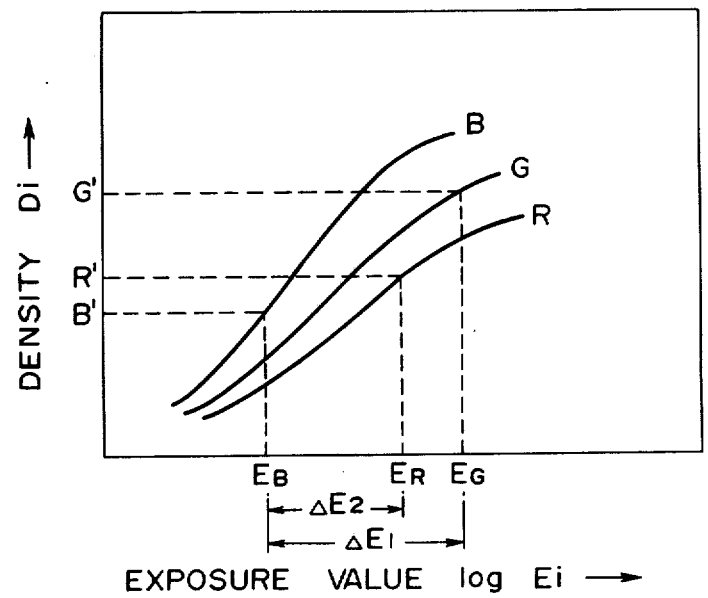
FIG. 3 is a graph showing the characteristic curves of the color photographic paper at the initial stage where a=0 and b=0 in the formula given in the disclosure.
Figure 5:
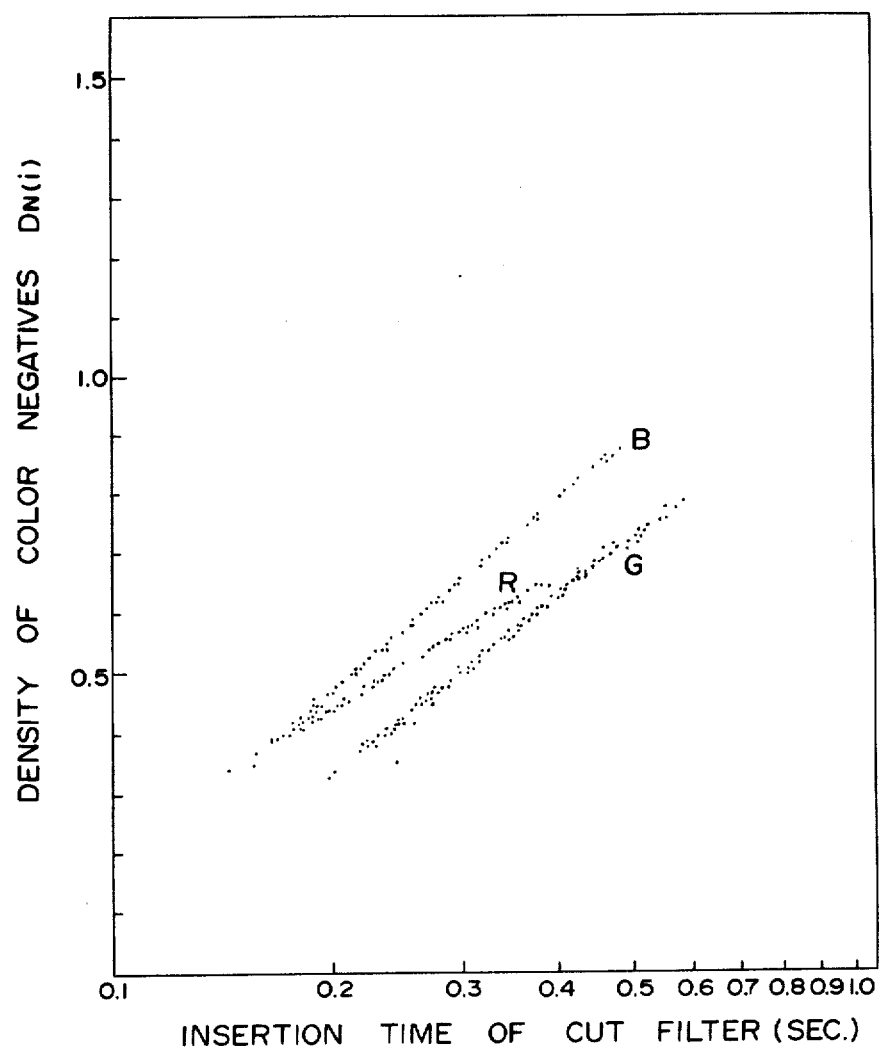
FIG. 5 is a graphical representation showing the relationship between the insertion time of cut filters and the average color densities of the color negatives.

Now, putting $a = 0$ and $b = 0$ in the above formula (4), the characteristic curves as shown in FIG. 3 are obtained. In order to print in teh preferred densities R', G' and B', the exposure values required for red, green and blue printing are $E_R$, $E_G$ and $E_B$ as shown in FIG. 5.

In this case, since $E_R \neq E_G \neq E_B$, it is impossible to obtain the preferred densities of R', G' and B' at the same time. However, by properly selecting the values a and b in the formula (4), the characteristic curves are changed to those as shown in FIG. 4 in which the preferred densities R', G' and B' can be obtained at the same time by providing an exposure value of E'.

The proper values for a and b can be selected by nonlinear optimization. By this optimization technique, the order and the time of insertion of the three cut filters C, M and Y can be properly determined.

In order to obtain the desirable values for a and b in the formula (4) to change the characteristic curves as shown in FIG. 3 to those as shown in FIG. 4 where $E' = E_R = E_G = E_R$, the amounts $\Delta a$ and $\Delta b$ by which the initial values of the variables a and b should be changed are obtained by use of the following formula (6). In formula (6) the preferred color densities R', G' and B' are designated by D'R, D'G and D'B.

$$\begin{matrix} \Delta a \\ \Delta b \end{matrix} = \begin{matrix} \frac{\partial \log E_G^{D'G}}{\partial a} & \frac{\partial \log E_G^{D'G}}{\partial a} \\ \frac{\partial \log E_R^{D'R}}{\partial a} & \frac{\partial \log E_R^{D'R}}{\partial a} \end{matrix} \begin{matrix} \Delta E_1 \\ \Delta E_2 \end{matrix} \quad (6)$$

where $\Delta E_1$ and $\Delta E_2$ are differences in exposure values as follows, $$\Delta E_1 = E_G - E_B,$$

$$\Delta E_2 = E_R - E_B.$$

Further, $$\frac{\partial \log E_G^{D'G}}{\partial a} = \frac{\partial}{\partial a}(-\log \frac{\int S'_\lambda \cdot T_\lambda \cdot x_G^{D'G} d\lambda}{\int S'_\lambda d\lambda}) \quad (7)$$

$$= -\frac{\partial}{\partial a}\{\log \frac{\int S_\lambda(1 + aY_\lambda + bY_\lambda M_\lambda)T_\lambda \cdot x_G^{D'G} d\lambda}{\int S_\lambda(1 + aY_\lambda + bY_\lambda M_\lambda) d\lambda}\}$$

$$= -\frac{1}{\log_e 10}\{\frac{\int S_\lambda(1 + aY_\lambda + bY_\lambda M_\lambda) d\lambda}{\int S_\lambda(1 + aY_\lambda + bY_\lambda M_\lambda)T_\lambda \cdot x_G^{D'G} d\lambda} - \frac{\int S_\lambda \cdot Y_\lambda d\lambda}{\int S_\lambda(1 + aY_\lambda + bY_\lambda M_\lambda) d\lambda}\}$$

Similarly, the following values can be obtained.

$$\frac{\partial \log E_R^{D'R}}{\partial a} \quad \frac{\partial \log E_G^{D'G}}{\partial b} \quad \frac{\partial \log E_R^{D'R}}{\partial b}$$

By the obtained $\Delta a$ and $\Delta b$, the initial values of a and b are changed to new values $a_1$ and $b_1$. When the values which have been successively changed n-times, namely when they become the n-th values, they are designated by $a_n$ and $b_n$. The first changed new values $a_1$ and $b_1$ are given by $$a_1 = a_0 + \Delta a = \Delta a$$

$$b_1 = b_0 + \Delta b = \Delta b.$$

By repeating the change of the values a and b, the exposure values $E_R$, $E_G$, $E_B$ are finally made equal to each other. Assuming that $a = 1.2$ and $b = -0.8$ are obtained by the above optimization, $$a = \frac{t_M - t_Y}{t_Y} = 1.2$$

$$b = \frac{t_C - t_M}{t_Y} = -0.8$$

*$t_M = 2.2\, t_Y$
$t_C = 1.4\, t_Y$
*$t_Y : t_M : t_C = 1 : 2.2 : 1.4$

Thus, the ratio of the exposure times, i.e. the insertion durations between the cyan, magenta and yellow cut filters is obtained. The absolute value of the exposure time is determined with reference to a particular case in which the calculation and the results of tests are made to correspond with each other.

Thus, the proper exposure can be obtained by a calculation performed in the above described manner on the bases of the selected spectroscopic energy distribution of the light source $S_\lambda$ of the color printer, the spectroscopic transmission $T_\lambda$ of the cyan, magenta and yellow cut filters and the spectroscopic sensitivity of the color photographic paper $x_iD_\lambda$. The time required for the calculation was about 5 seconds when a computer was used. Five seconds is too long and impractical when the method is used in an automatic color printer. Therefore, it is desired to determine the proper exposure time, i.e. the insertion time of the cut filters, in a much shorter time.

Figure 6:
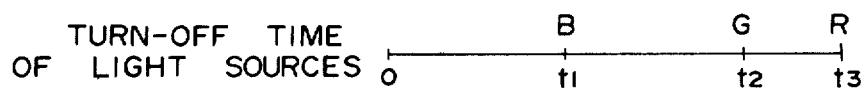
FIG. 6 is a time scale showing the turn-off time of the light source.

In order to meet this requirement, a general formula for determining the exposure time based on the measured densities of the originals has been established by the present inventors. When the densities of three colors $D_N(R)$, $D_N(G)$ and $D_N(B)$ of the flesh color points in negatives are plotted in relation with the insertion time of the cut filters C, M and Y calculated in the aforesaid manner, a graphical representation as shown in FIG. 5 is obtained. FIG. 6 shows that the logarithm of the exposure time, insertion time, and the densities of the color components in the flesh color are in a linear relationship which can be given by the following formula.

$$\log T_i = \sum_{i=1}^{3} a_{ij} D_N(j) + \beta_i \quad (i = 1, 2 \text{ or } 3) \quad (8)$$

By use of this formula (8), the desirable exposure time can easily be obtained.

Now the description will hereinbelow be made with respect to the additive printing process. In the additive color process, three light sources of three colors, i.e. red, green and blue, are turned off in a proper order. For instance, as shown in FIG. 6, a blue light source is turned off at a time t1, a green light source is turned off at a time t2 and a red light source is turned off at a time t3 after the three color light sources were turned on at once together. In this case, under such circumstances, the spectroscopic energy distribution of the light sources is represented by the following formula.

$$S'_\lambda = (B_\lambda + G_\lambda + R_\lambda)t1 + (G_\lambda + R_\lambda)(t2 - t1) + R_\lambda(t3 - t2) = \quad (9)$$

$$(B_\lambda + G_\lambda + B_\lambda)t1 \left\{ 1 + \frac{G_\lambda + R_\lambda}{B_\lambda + G_\lambda + R_\lambda} \cdot \frac{t2 - t1}{t1} + \frac{R_\lambda}{B_\lambda + G_\lambda + R_\lambda} \cdot \frac{t3 - t2}{t1} \right\}$$

Substituting $$B_\lambda + G_\lambda + R_\lambda = S_\lambda$$
$$\frac{G_\lambda + R_\lambda}{B_\lambda + R_\lambda + R_\lambda} = Y_\lambda$$
$$\frac{R_\lambda}{B_\lambda + R_\lambda + R_\lambda} = Y_\lambda M_\lambda$$
$$\frac{t2 - t1}{t1} = a$$
$$\frac{t3 - t2}{t1} = b$$

into the formula (9), $$S'_\lambda = S_\lambda t1 (1 + aY_\lambda + bM_\lambda) \quad (10)$$

The formula (10) corresponds to the formula (4) of the subtractive color process. Therefore, the time for turning off the light sources can also be obtained similarly to the method employed in the subtractive color process.

In the above embodiment, the description has been made with an example wherein the particular color is a flesh color. When the particular color is green of trees, blue of skies, or bluish white of snows, such a particular color is detected and printed into the preferable color balance and density.

Figure 7:
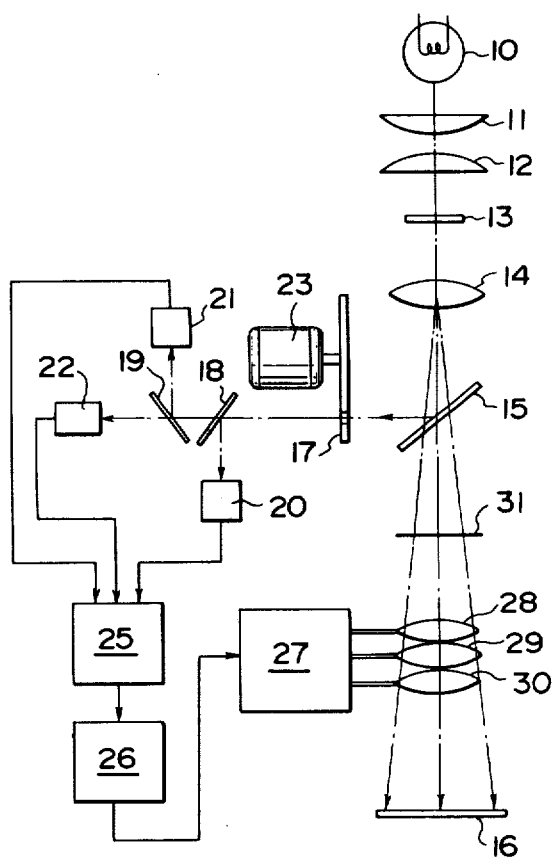
FIG. 7 is an explanatory view including a block diagram showing a color printer in accordance with an embodiment of the present invention.

FIG. 7 shows an embodiment of the color printer in accordance with the present invention. A light beam emitted by a light source 10 is incident upon a color film 13 through condenser lenses 11 and 12. The light beam passing through the color film 13 advances through an enlarging lens 14 and is partly reflected by and partly transmits through a half-transparent mirror 15. The enlarging lens 14 is movable along its optical axis to vary the enlarging magnification of the color printer. The light passing through the half-transparent mirror 15 reaches a color paper 16 to focus an image of the color film 13 thereon. The light reflected by the half-transparent mirror 15 passes through a rotatable disc 17 and dichroic mirrors 18 and 19. By the dichroic mirrors 18 and 19, the light beam is separated into red, green and blue components, which are received by three light photoreceptors 20, 21 and 22, respectively, to measure the three color densities of a portion of the color film 13 scanned by the rotatable disc 17.

The rotatable disc 17 is rotated at a constant speed by a motor 23 to linearly scan the color film 13.

Figure 8:
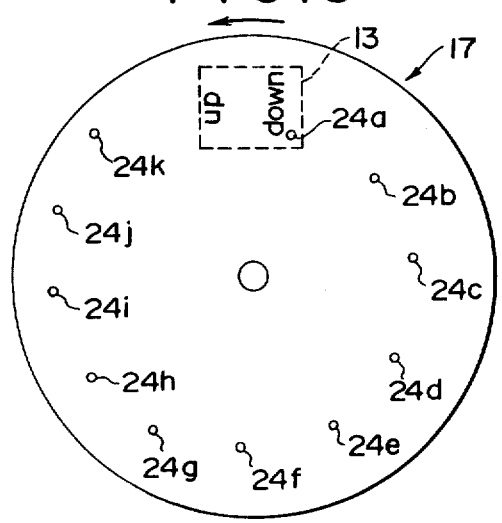
FIG. 8 is a plan view of a rotatable disc used for scanning color originals.

FIG. 6 shows an example of a rotatable disc with the perforations employed in the above embodiment of the present invention. The rotatable disc 17 has a number of angularly spaced small perforations 24a to 24k each at different distance from the center of rotation thereof for measuring the density of a number of points on the negative 13 by scanning the negative 13 in the vertical direction. The first perforation 24a is located to scan the leftmost part of the negative 13 and the last perforation 24k is located to scan the rightmost part of the negative 13. The rotatable disc 17 is provided with a position detector for synchronizing the position of the disc with the measuring timing. The position detector may be replaced with notches formed on the periphery of the disc 17 combined with a photocoupler located at a position to see the periphery. For instance, when the first perforation 24a scans the lower portion (rightmost part in the drawing) of the color film 13 in FIG. 8, the measured outputs of the photoreceptors 20, 21 and 22 are sampled at equal intervals. Thus, the three color densities R, G and B of the sampled points on the color film 13 are measured.

By means of the perforations 24a to 24k, the color film 13 is scanned at intervals of 1 mm. Thus, the red, green and blue densities R, G and B are measured at a number of points, e.g. 748 points when the size of the color film 13 is 22 mm×34 mm. The density signals obtained by the three photoreceptors 20, 21 and 22 are sent to a color detector 25. In the color detector 25 is memorized information which defines the color of the particular subjects such as a human figure, trees, skies, snows etc. When the three color densities of a measured point are contained in a defined region of a particular color, the color of the measured point is determined to be of the particular color. The determination is conducted by use of an analogue or degital circuitry. When the color of the measured point is determined to be of a particular color, the three color densities R, G and B of the point are memorized.

The particular color should be selected among predetermined several kinds of particular colors as mentioned hereinbefore such as flesh color of human figures, green of trees, blue of skies, bluish white of snows and so forth. The particular color may be preselected before the measurement, or may be determined after the measurement. That is, when more than one particular subject are included in a color film, the particular subject which is to be printed in a preferable color may be determined according to the rate of the areas occupied thereby or according to the degree of importance thereof. For instance, when the color film carries a picture of a human figure in the background of snows, the human figure is selected to be the particular subject since the human figure is a principal subject matter and accordingly the flesh color is determined to be the particular color. When the color film carries a picture of trees and skies, the particular subject is determined by the rate of areas occupied. Namely, if the trees occupies a larger area than the skies, the trees should be selected to be the particular subject and the color printer is controlled to obtain a preferable green of trees on the print. The rate of the area of a particular color in the color film can be measured by the number of the measured points which are determined to be of the particular color. When the number of points determined as being of a particular color is more than a predetermined number, the color original is determined to have the particular subject having the particular color, and the exposure is controlled as described hereinabove.

That is, when the color negative or original has been determined to have a subject matter of the particular color, the mean densities of the three colors $\overline{R}$, $\overline{G}$ and $\overline{B}$ are calculated from the densities of all the points determined to be of the particular color.

The signal of the mean densities of the three colors $\overline{R}$, $\overline{G}$ and $\overline{B}$ of the particular subject are sent to an arithmetic memory circuit 26. In the arithmetic memory circuit 26 are memorized formulae representing the relationship between the densities on the color film and the color filter insertion time for every particular color.

Therefore, when the mean densities $\overline{R}$, $\overline{G}$ and $\overline{B}$ of the particular subject are put into the arithmetic memory circuit 26, a filter control output signal for printing the particular subject into a preferable color is generated therefrom. By the filter control output signal a filter control portion 27 is operated to insert the cyan cut filter 28, magenta cut filter 29 and yellow cut filter 30 into the optical path between the half transparent mirror 15 and the color paper 16 and terminate the exposure of the respective colors. In order that the color paper 16 may not be exposed to light while the insertion time of the cut filter is calculated by the measuring portion, a shutter 31 is provided between the color paper 16 and the mirror 15. The shutter 31 is inserted into the optical path when the exposure is completed and is retracted from the optical path when the measurement is completed.

I claim:

1. A method of controlling exposure time in a color printer in which at least two different color filters are used and the insertion time thereof is controlled to reproduce a preferable color on prints from a color original comprising the steps of selecting a particular color contained in the color original by (a) measuring three primary color densities of a number of points of the color original and (b) detecting a preselected particular color among the colors of said number of points of the color original, obtaining a relation between the three mean color densities of said particular color in the color original and the preferable insertion time of said color filters to print said particular color into the particular color of preferable color balance and density on the color paper, and controlling the insertion time of said color filters based on the obtained relation according to the said three mean color densities of the particular color in the color original, thereby printing the particular color in the color original into the particular color of preferable color balance and density.

2. A method of controlling exposure time in a color printer as defined in claim 1 wherein said particular color is selected among colors of particular subjects which are often photographed in color photos.

3. A method of controlling exposure time in a color printer as defined in claim 2 wherein said particular color is selected among a flesh color, green of trees, blue of skies or sea, and bluish white of snows.

4. A method of controlling exposure time in a color printer as defined in claim 1 wherein said relation between the color density of said particular color in the color original and the preferable insertion time of said color filters is represented by a linear function.

5. A color printer provided with at least two different color filters the insertion time of which is controllable independently for printing a color image on a color paper from a color original comprising a color measuring means which measures three primary color densities of a number of points of the color original, a color detecting means connected with said color measuring means for detecting a preselected particular color among the colors of said number of points of the color original, an arithmetic means connected with said color detecting means for determining the insertion time of said color filters according to the three mean color densities of the particular color, and a filter control means connected with said arithmetic means for controlling the insertion time of said color filters according to the output of said arithmetic means, said arithmetic means memorizing a relation between the three mean color densities of said particular color in the color original and the preferable insertion time of said color filters to print said particular color into the particular color of preferable color balance and density on the color paper.

6. A color printer as defined in claim 5 wherein said color filters are three primary color filters for additive color process.

7. A color printer as defined in claim 5 wherein said color filters are three primary color filters for subtractive color process.

* * * * *